US011175795B2

(12) United States Patent
Kan et al.

(10) Patent No.: US 11,175,795 B2
(45) Date of Patent: Nov. 16, 2021

(54) METHOD FOR DYNAMICALLY DISPLAYING DIGITAL CONTENT, GRAPHICAL USER INTERFACE AND SYSTEM THEREOF

(71) Applicant: Framy Inc., Grand Cayman (KY)

(72) Inventors: Nien-Ko Kan, Taipei (TW); Chun-Yeh Huang, Taipei (TW); Chia-Yuan Cheng, Taipei (TW)

(73) Assignee: FRAMY INC., Grand Cayman (KY)

( * ) Notice: Subject to any disclaimer, the term of this patent is extended or adjusted under 35 U.S.C. 154(b) by 0 days.

(21) Appl. No.: 17/065,585

(22) Filed: Oct. 8, 2020

(65) Prior Publication Data

US 2021/0109645 A1 Apr. 15, 2021

Related U.S. Application Data

(60) Provisional application No. 62/912,845, filed on Oct. 9, 2019.

(51) Int. Cl.
*G06F 3/0481* (2013.01)
*G06F 16/9537* (2019.01)
(Continued)

(52) U.S. Cl.
CPC ........ *G06F 3/04817* (2013.01); *G06F 3/0482* (2013.01); *G06F 3/0488* (2013.01);
(Continued)

(58) Field of Classification Search
CPC .................................................. G06F 3/04817
(Continued)

(56) References Cited

U.S. PATENT DOCUMENTS 10,963,529 B1 * 3/2021 Amitay ............... G06F 16/9537
2007/0011150 A1 * 1/2007 Frank ................... G06F 16/9537
(Continued)

FOREIGN PATENT DOCUMENTS

| TW | 201408993 A | 3/2014 |
| TW | 201447798 A | 12/2014 |
| WO | WO 2018200043 A1 | 11/2018 |

OTHER PUBLICATIONS

Nicola Maiellaro, et al., "One-Page Multimedia Interactive Map," ISPRS International Journal of Geo-Information, Jan. 24, 2017.

*Primary Examiner* — Reza Nabi
(74) *Attorney, Agent, or Firm* — Li & Cai Intellectual Property (USA) Office

(57) ABSTRACT

A method for dynamically displaying digital content, graphical user interface and a system thereof are provided. The graphical user interface displays multiple points of interest (POI) indicative of links of digital contents in a non-uniform arrangement. On a browsing page, the main POIs can be represented by thumbnails of associated digital contents on the interface. A user can browse the POIs and select one of the POIs via a touch-sensitive means, so as to play the digital contents. While selecting the POI, the POI becomes a center where the other POIs move toward that forms a converging animation effect. Afterwards, the digital contents associated to the selected POI are played sequentially on a playback page. The thumbnail of the POI is refreshed since some digital contents associated to the POI have been played when closing the playback page and returning to the browsing page.

18 Claims, 10 Drawing Sheets

(51) Int. Cl.
   *G06F 16/29*    (2019.01)
   *G06F 3/0482*   (2013.01)
   *G06F 3/0484*   (2013.01)
   *G06F 3/0488*   (2013.01)
   *G06T 13/80*    (2011.01)
(52) U.S. Cl.
   CPC .......... *G06F 3/04845* (2013.01); *G06F 16/29* (2019.01); *G06F 16/9537* (2019.01); *G06T 13/80* (2013.01)
(58) Field of Classification Search
   USPC ........................................................ 715/835
   See application file for complete search history.

(56) References Cited

U.S. PATENT DOCUMENTS

| | | | | |
|---|---|---|---|---|
| 2008/0059452 A1* | 3/2008 | Frank | G06F 16/954 |
| 2008/0172627 A1* | 7/2008 | Hagawa | G06F 3/04892 | 715/765 |
| 2008/0307311 A1* | 12/2008 | Eyal | H04L 67/06 | 715/733 |
| 2009/0184982 A1* | 7/2009 | Takakura | H04N 5/772 | 345/681 |
| 2009/0284551 A1* | 11/2009 | Stanton | G06F 16/58 | 345/629 |
| 2010/0073487 A1* | 3/2010 | Sogoh | H04N 5/85 | 348/207.1 |
| 2010/0115407 A1* | 5/2010 | Kim | G06F 3/0481 | 715/708 |
| 2010/0246965 A1* | 9/2010 | Epshtein | G06K 9/00711 | 382/187 |
| 2010/0257163 A1* | 10/2010 | Ohazama | G06Q 30/02 | 707/724 |
| 2010/0321406 A1* | 12/2010 | Iwase | G11B 27/105 | 345/638 |
| 2011/0055187 A1* | 3/2011 | Cai | G06F 16/9537 | 707/706 |
| 2011/0055762 A1* | 3/2011 | Jung | G06F 3/0481 | 715/835 |
| 2011/0163971 A1* | 7/2011 | Wagner | G06F 3/04883 | 345/173 |
| 2011/0246269 A1* | 10/2011 | Hansen | G06Q 30/00 | 705/14.4 |
| 2012/0109836 A1* | 5/2012 | Chen | G06Q 10/10 | 705/319 |
| 2012/0141046 A1* | 6/2012 | Chen | G01C 21/3682 | 382/282 |
| 2013/0150124 A1* | 6/2013 | Kim | G06F 16/9537 | 455/556.1 |
| 2014/0040808 A1* | 2/2014 | Kim | G06F 3/04817 | 715/771 |
| 2014/0074712 A1* | 3/2014 | Palmer | G06Q 30/06 | 705/44 |
| 2014/0108383 A1* | 4/2014 | Chan | G06Q 50/01 | 707/722 |
| 2014/0298169 A1* | 10/2014 | Williams | H04N 21/26258 | 715/716 |
| 2014/0310655 A1* | 10/2014 | Sims | G06F 3/04817 | 715/838 |
| 2014/0337346 A1* | 11/2014 | Barthel | G06F 16/435 | 707/738 |
| 2015/0085114 A1* | 3/2015 | Ptitsyn | H04N 5/232933 | 348/143 |
| 2015/0169139 A1* | 6/2015 | Leva | G06F 3/0481 | 701/455 |
| 2015/0186398 A1* | 7/2015 | Yan | G06F 40/12 | 715/777 |
| 2015/0331560 A1* | 11/2015 | Song | G06F 3/0482 | 715/765 |
| 2016/0063011 A1* | 3/2016 | Wehbi | G06F 16/60 | 707/711 |
| 2016/0140244 A1* | 5/2016 | Gerding | G06F 16/9535 | 707/769 |
| 2016/0290820 A1* | 10/2016 | Nakagawa | G01C 21/3605 |
| 2016/0360336 A1* | 12/2016 | Gross | H04M 1/72403 |
| 2017/0126592 A1* | 5/2017 | El Ghoul | H04L 51/24 |
| 2017/0180780 A1* | 6/2017 | Jeffries | H04N 21/4307 |
| 2017/0293673 A1* | 10/2017 | Purumala | G06F 3/04847 |
| 2017/0357414 A1* | 12/2017 | Chang | G06F 3/04847 |
| 2018/0088777 A1* | 3/2018 | Daze | G06F 3/0488 |
| 2018/0101238 A1* | 4/2018 | Thomas-Brigden | H04N 21/482 |
| 2018/0315134 A1* | 11/2018 | Amitay | H04L 51/32 |
| 2019/0057136 A1* | 2/2019 | Constantinides | G06Q 30/02 |
| 2019/0116473 A1* | 4/2019 | Constantinides | H04L 51/10 |
| 2019/0130498 A1* | 5/2019 | Constantinides | H04W 4/185 |
| 2020/0014816 A1* | 1/2020 | Speasl | H04N 1/32128 |
| 2020/0120170 A1* | 4/2020 | Amitay | G06F 3/0488 |
| 2020/0309994 A1* | 10/2020 | Eckel | G06N 5/02 |
| 2020/0404464 A1* | 12/2020 | Constantinides | G06Q 10/10 |
| 2021/0099677 A1* | 4/2021 | Seidman | H04W 4/021 |

\* cited by examiner

METHOD FOR DYNAMICALLY DISPLAYING DIGITAL CONTENT, GRAPHICAL USER INTERFACE AND SYSTEM THEREOF

CROSS-REFERENCE TO RELATED PATENT APPLICATION

This application claims priority to the U.S. Provisional Patent Application Ser. No. 62/912,845 filed on Oct. 9, 2019, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is generally related to a method for displaying digital content, and more particularly to a method for dynamically displaying digital content with selective thumbnails of digital contents in a display area, a graphical user interface and a system.

BACKGROUND OF THE DISCLOSURE

With recent rapid development of computer and network communication technologies, people usually communicate with each other in social media. People can interact with each other via messages and share digital contents that are viewed or produced by the people in the social media. The digital content can be a video, a picture or a text. The digital contents can be shared through comments in the social media mentioning web addresses of the digital contents. People can watch the digital contents via a web page when viewing the comments and clicking on the web addresses.

However, the digital contents are mainly shared in the social media via a user interface in which the shared links can be shown in a list, or with graphical thumbnails. When a video is shared, the video can be played directly if the related contents are viewed by the people. Alternatively, the digital content to be shared may be played for a few seconds for attracting the people to continue watching the content.

One of the popular video/audio sharing social media is such as Instagram®, which is a social media application that provides online pictures and videos. The selectable digital contents on Instagram can be shown as pictorial or video thumbnails that are arranged in an array or in lattices on a main page. The digital contents can be sorted in an alphabetic order, sorted based on the correlations, or even based on the fees of commercial advertisements. People can therefore select the content of interest from the pictures or videos, and the selected content can be displayed or played on another page.

SUMMARY OF THE DISCLOSURE

The disclosure provides a method for dynamically displaying digital contents, a graphical user interface and a system for implementing the method that are different from the current or conventional way to play video/audio of a content using a social application that includes links to the video/audio contents. The technology allows a user to select one of the digital contents whose links are arranged non-uniformly, rather than being in the traditional arrangements, on the graphical user interface. The traditional arrangements indicate that the links of the digital contents are presented as thumbnails or representative icons that are shown in a list or in an array on the graphical user interface. The method uses a graphical user interface (GUI) to dynamically show the links associated to the digital contents. The graphical user interface (GUI) can be an electronic map. A specific filtering method can be incorporated to obtain the coordinates or location-based digital contents. Afterwards, the linking icons associated to the coordinates or locations of the digital contents are shown at the corresponding locations on the graphical user interface. The linking icon of the digital content can be a thumbnail, a representative image or an avatar or a picture of the user who produces the digital content.

According to one embodiment of the method for dynamically displaying digital content, the system applying the method includes a serving system that serves digital contents for users, and a software program that is executed in a user device. The software program can be a playback program operated through a graphical user interface in the user device for playing the digital contents. In the method, the system acquires a coordinate range of a display area of the user device. The range of the display area can be decided by the user who operates the user device. After the display area is decided, a sequence of the software program executed in the user device is configured to connect to the serving system, querying the database of the serving system, and obtain a plurality of digital contents, linking addresses of the digital contents (i.e., database address), the coordinates of each of the digital contents in the display area, and a score of every digital content that associate with the display area. It should be noted that the coordinates of the digital content indicates the location where the digital content is produced.

Afterwards, the display area is configured to show multiple points of interest based on the coordinate range of the display area, the coordinates of the digital contents associated with the display area, and various criteria to display the points of interest in the display area. Each of the points of interest associates with the coordinates in the display area and a number of digital contents in the coordinate range. The above-mentioned criteria include a size of every linking icon or every ordinary linking symbol, an upper limit of the number of the digital contents associated to each of the points of interest, a distance between every two adjacent points of interest, and a number of the points of interest that are shown as the linking icons. It should be noted that the size of the linking icon or the linking symbol can be decided according to the number of digital contents and the scores of these digital contents.

Next, a ranking of the plurality of points of interest in the display area can be calculated according to the scores of the digital contents associated to the points of interest. Multiple linking icons shown in the display area are used to indicate a certain number of highest ranking of points of interest. Further, multiple ordinary linking symbols are used to indicate the rest of the points of interest within the display area. Through these two types of linking icons/symbols, the points of interest with higher ranking can be highlighted in the display area and the display area may not be congested with the points of interest.

Further, when the display area changes, the steps in the method for dynamically displaying digital content are repeated for refreshing the multiple points of interest in the display area. On the other hand, the digital contents that have been viewed by the user can be labeled by a software procedure running in the user device. In the meantime, the points of interest shown in the display area can be refreshed when returning back to the browsing page.

In one aspect of the disclosure, the digital content is scored by the serving system based on, a number of creations of an authoring user of the digital content, a number of followers of the digital content, a number of times to play the digital content, evaluation, time to produce the digital content, or personal interest of the user who views the digital content, or any combination thereof, however, in actual implementation, the scoring is not limited to items listed above.

Furthermore, when the user device receives a selection signal, the system determines the points of interest to be selected according to the selection signal. Thus, before entering a playback page, a converging animation effect is performed. In the related steps, the point of interest to be selected is set as a central point of interest, and the linking icons and ordinary linking symbols of the other points of interest form multiple moving images moving along multiple moving paths from their positions toward the central point of interest. In an aspect of the disclosure, the moving path for each of the other points of interest is established according to a direction and a distance toward the central point of interest. In the method for dynamically displaying digital contents, multiple images are produced along the moving path for a period of time for each of the moving images. The multiple images used for the moving images are shown orderly and continuously so as to present the converging animation effect. The converging animation effect simulates the moving images moving toward the central point of interest and can be presented on the graphical user interface.

According to one embodiment of the disclosure, the graphical user interface used to show the dynamic digital contents is displayed on a touch screen of the user device. The graphical user interface includes a visualized display area that is provided for showing the digital contents associated to the display area. The links to the digital contents are associated to a point of interest. A plurality of points of interest associated to the plurality of digital contents can be shown in the display area. A ranking of these digital contents is obtained and is referred to, so as to play the digital contents in an order when one of the points of interest is selected.

In one further aspect of the disclosure, the serving system used to serve the digital contents and a software program executed in the user device form a system that implements the method for dynamically displaying digital content.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
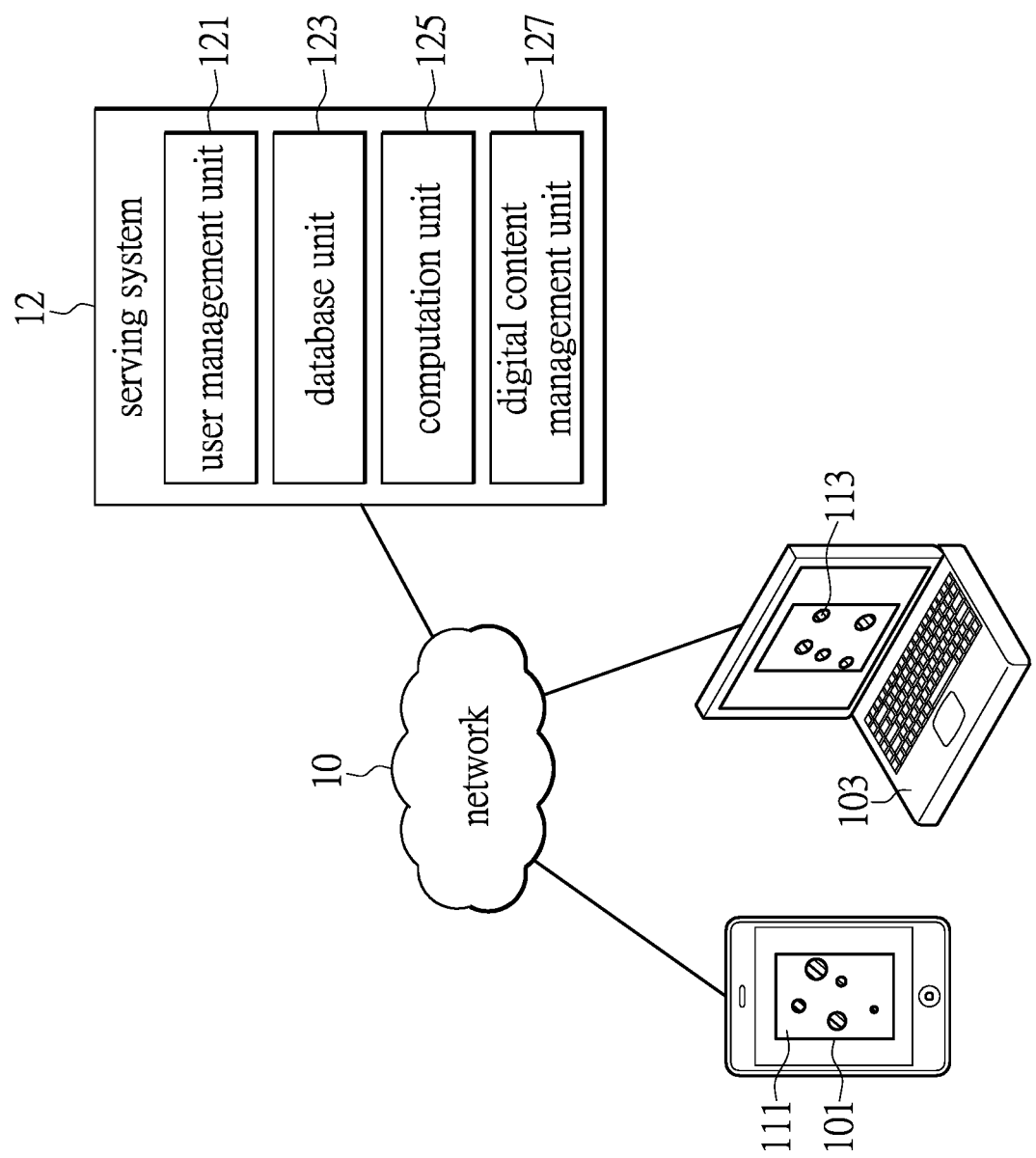
FIG. 1 is a schematic diagram depicting a system framework that implements a method for dynamically displaying digital content according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is generally related to a method for dynamically displaying digital content, a graphical user interface (GUI) and a system thereof. The method is applicable to the graphical user interface on which the digital contents are dynamically changed at any time. The digital contents shown on the graphical user interface are periodically refreshed since the digital contents may be frequently changed. Therefore, the digital contents shown on the graphical user interface can be maintained in an updated status. For example, the graphical user interface can be a webpage used to show news that are frequently changed, or a social media application that allows everyone to share contents in real time.

The technology used in the system that provides the graphical user interface is different from the current or the conventional method to show the selectable video/audio contents in a list or an array, and shows the links of the digital contents in a non-uniform arrangement. The graphical user interface provided by the system can show the links of the digital contents thereon dynamically. The selectable links of the digital contents can be shown in a user interface under a simulated situation. Alternatively, the links of the digital contents can be marked at corresponding coordinates on an electronic map where the digital contents are generated. The graphical user interface allows users to select any interesting digital content intuitively. The digital content can be text, images, or videos, or any combination thereof.

The method for dynamically displaying digital content is implemented by a computer system through a graphical user interface in a user device. Rather than the conventional way to show the thumbnails of the digital contents in a list or in an array or grids, the digital contents in the method are shown in the graphical user interface in a non-uniform arrangement. In addition to providing the graphical user interface for the user to conveniently browse and select digital contents, the method updates the links of the digital contents shown in the graphical user interface according to changes of the display area in response to the operation of the user, or the status of each of the digital contents that are played or not played.

Therefore, when the graphical user interface dynamically and non-uniformly shows the links of the digital contents, the method for dynamically displaying digital content is performed. A specific method for filtering and ranking can be used to mark the links of the digital contents at corresponding locations in a display area, i.e., a viewport. The locations in the display area are such as coordinates or locations on an electronic map. By the filtering and ranking method, the links of the digital contents shown on the graphic user interface can be periodically updated. Further, the links of the digital contents shown on the graphical user interface can also be updated based on whether or not the digital content is viewed by the user. The link with respect to each of the digital contents can be a thumbnail which is retrieved from the digital content or a representative image of an authoring user of the digital content. The representative image can be a picture or an avatar that can be a still or a dynamical image. The link of the digital content is an address that links to the physical digital content, i.e., links to a digital content file in a database of the serving system.

FIG. 1 is a schematic diagram depicting a system framework that implements the method for dynamically displaying digital content according to one embodiment of the disclosure. A serving system 12 is provided for serving digital contents to various user devices 101 and 103 via a network 10. The serving system 12 allows the user devices 101 and 103 to obtain links of the digital contents via the network 10. In each of the user devices 101 and 103, a software procedure is executed to receive the links to the digital contents, obtain the digital contents according to requirements, and dynamically display digital contents, so that the digital contents can be browsed and played. In particular, the links of the digital contents can be displayed on a picture under a specific circumstance or an electronic map, such as the graphical user interfaces 111 and 113 that are exemplarily shown on the screens of the user devices 101 and 103 respectively. The serving system 12 and the software programs executed in the user devices 101 and 103 embody the system that implements the method for dynamically displaying digital content.

The user device 101 or 103 is such as a mobile device of a user which is equipped with a touch screen that allows the user to operate by gestures of fingers. The user can use gestures to decide on browsing a display area and selecting a point of interest on a browsing page via the software program executed in the user device 101 or 103. After selecting the point of interest, a playback page is initiated by the software program to play the digital contents associated to the selected point of interest.

Multiple functional elements are implemented by software or with hardware in the serving system 12. One of the functional elements in the serving system 12 is a user management unit 121. The user management unit 121 is used to manage the users who provide the digital contents to the serving system 12. By the user management unit 121, the user is permitted to browse and play the digital contents through identity authentication. The user management unit 121 also stores the records of use of digital contents in the serving system 12 by the users, the digital contents that the users create, and activity records of the users in the social media.

The serving system 12 includes a database unit 123 that can be a database. A plurality of files of digital contents are stored in the database. Each of the digital contents is assigned with a database address in the database unit 123. All the digital contents in the display area link to the database addresses of specific files. The database unit 123 allows a software procedure in the user device to query the database based on the display area. Preferably, by querying the database of the serving system, a plurality of digital contents associated to the display area, a linking address of each of the digital contents, coordinates of each of the digital contents within the display area, and a score of every digital content can be obtained.

The serving system 12 includes a computation unit 125 that is the circuit for processing data such as a coordinate range of a display area, a linking address of the digital content, digital contents and locations associated to the point of interest, the display content to be refreshed, and a score of digital content provided by a user device.

The digital content management unit 127 is used to process the uploaded and downloaded digital contents. The digital contents can be stored to a database. A database address corresponding to the digital content and the coordinates of the point of interest are rendered and stored to the database along with data of the authoring user of the digital content.

The graphical user interface 111 or 113 can show an electronic map. The linking icons of the digital contents are displayed at some locations in the display area according to their corresponding geographic coordinates. The linking icons of the digital contents can be used as the representative images of the point of interest which gathers a plurality of digital contents. The linking icon can be a thumbnail of the digital content, or an image of an avatar of a user who produces the digital content or a picture.

The score of the digital content can be obtained according to various scoring factors. The scoring factors is provided by the serving system and the digital content is scored by the serving system based on a number of creations of an authoring user of the digital content, a number of followers of the digital content, a number of times the digital content is played, a rating, a time that the digital content is created, or a personal interest of the user viewing the digital content, or any combination thereof. In actual implementation, the scoring is not limited to items listed above.

Each of the browsing users can have his own preferred list that allows the serving system to determine interests of the user. Therefore, the serving system can rely on the preferred list to prioritize the related digital contents to be played and to set up the points of interest on the display area.

Figure 2:
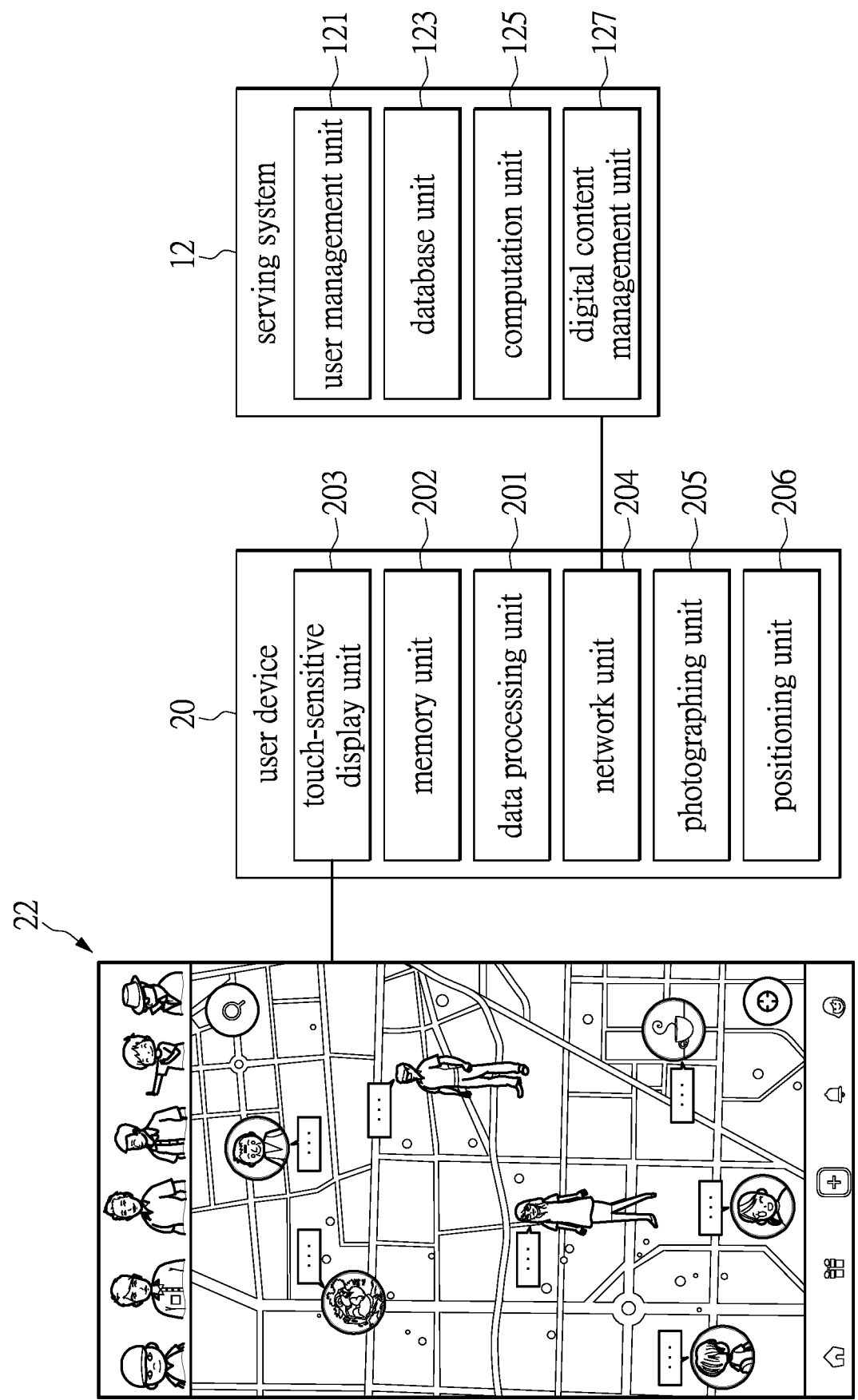
FIG. 2 is a schematic diagram depicting functional elements of a serving system and a user device according to one embodiment of the present disclosure.

Reference is made to FIG. 2, which is a schematic diagram depicting the functional elements of a serving system and a user device according to one embodiment of the disclosure. The functional elements can be implemented by software or by cooperation with hardware.

According to one embodiment, the serving system 12 includes a user management unit 121, a database unit 123, a computation unit 125, and a digital content management unit 127. The serving system 12 connects to a user device 20 via a network. The user device 20 can be a portable device such as a smart device carried by the user. The user device 20 includes a data processing unit 201 for processing data, and a memory unit 202 that is a storage media of the user device 20. The memory unit 202 can be used to temporarily store the digital contents and the data relating to the digital contents and points of interest that are retrieved from the database unit 123 of the serving system 12.

The user device 20 includes a touch-sensitive display unit 203 that is a circuit allowing the user to operate and decide the display area, and a network unit 204 that is a circuit to connect to the serving system 12. After establishing the connection, the user device 20 can transmit and obtain the information about the digital content and download the digital content according to a link.

The user device 20 includes a photographing unit 205 that is a circuit allowing the user to produce the digital content by the user device 20. The user device 20 includes a positioning unit 206 that is used to generate positioning data of the user device 20. The positioning unit 206 is such as a receiver of GPS (global positioning system). The GPS data is used for positioning the user device 20. When the positioning unit 206 of the user device 20 generates the positioning data and the touch-sensitive display unit 203 displays a display area, the data can be transmitted to the serving system 12 via the network unit 204. The serving system 12 then responds to these data by transmitting links of the related digital contents to the user device 20. Through a software procedure operated in the user device 20, the points of interest to be displayed are determined. A graphical user interface 22 is provided for showing the selectable points of interest and playable digital contents.

The display area is such as an electronic map or a user interface with a simulated circumstance. In particular, the points of interest are shown on the display area in a non-uniform arrangement. Taking the electronic map as an example, the serving system 12 relies on the user's location or a specific location decided by the user to provide the contents for the user.

Figure 3:
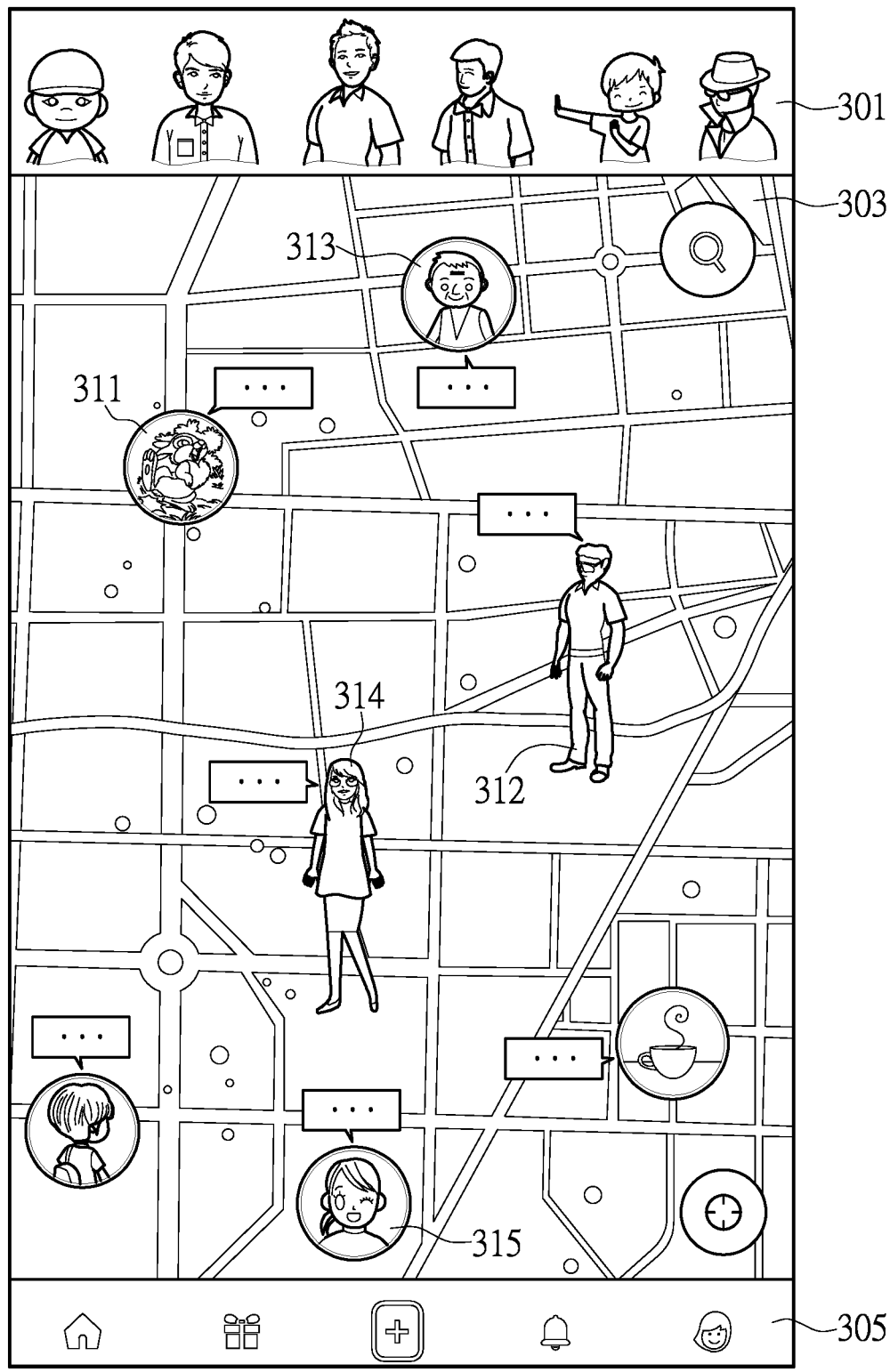
FIG. 3 is a schematic view depicting a graphical user interface that links the digital contents in non-uniform arrangement according to one embodiment of the present disclosure.

The digital contents can be dynamically displayed on a graphical user interface as exemplarily shown in FIG. 3.

FIG. 3 is a schematic diagram depicting the graphical user interface that shows the links of the digital contents in a non-uniform arrangement according to one embodiment of the disclosure. Different from the traditional way of showing the thumbnails of digital contents in a list or in a grid, the graphical user interface 30 used in the method for dynamically displaying the digital content of the disclosure shows the links of the digital contents with an electronic map as a background. The links shown on the graphical user interface associate to one or more digital contents that are produced by many users. Preferably, each of the digital contents associates to a location where the digital content is produced, and the location can be a geographic coordinate shown on the electronic map.

The computer-implemented graphical user interface 30 can be a touch screen of the user device. The graphical user interface 30 includes a visualized display area (i.e., a viewport) 303. The user device initiates the graphical user interface 30 by a software means. The graphical user interface 30 defines a display area 303 covering a coordinate range according to the operation performed by the user on a touch screen. The links of the digital contents can be displayed within an area in a non-uniform arrangement, that is, a browsing page is formed to show the plurality of points of interest. The link of each of the digital contents can be shown as an avatar or a thumbnail that acts as a representative image of the digital content. The link of the digital content can also be an ordinary linking symbol that is exemplarily a little circle shown on the display area. The links are shown as the graphs 311, 312, 313, 314 and 315 that are provided for the user to select in order to play the corresponding digital content.

In the exemplary diagram, a user linking area 301 is shown at top of the screen. The user linking area 301 can also be used to show recent tracking locations (e.g., in 72 hours) or the digital contents which are produced (or owned) by the authoring users that are followed. In one further embodiment of the disclosure, the user linking area 301 can be accompanied with the links of the locations which the system determines as meeting interests of the browsing user, or the links of the digital contents which are produced by the authoring users that are recommended by the system. Every link in the user linking area 301 can be used to link to proprietary page of each of the users that allows the user to select one of the links (e.g., links of the authoring users), so as to enter a playback page for playing the digital content of one of the authoring users. A functional area 305 is shown at bottom of the screen. The functional area 305 is provided for the user to operate the graphical user interface 30. The functional area 305 can include various functional buttons that are often seen in a social media and provided for linking to a main page of a user, obtaining reward, adding digital content, linking to a reminder and linking to a user setting page. The functional area 305 can also be adjusted according to practical needs.

According to the embodiment shown in the diagram, the method provides a scheme to present the location-based digital contents as points of interest shown on an electronic map. The main screen of the graphical user interface is a display area 303 that uses the electronic map as a background. The points of interest shown on the electronic map can be presented by one of the graphs 311, 312, 313, 314 and 315 that link to a plurality of digital contents. The graphs 311, 312, 313, 314 and 315 can be round icons or human-shaped images. The points of interest can be shown on the graphical user interface in a non-uniform arrangement. When the user uses his handheld device to take pictures or videos, the digital contents will carry the information of geographic locations where the pictures or the videos are produced. It is also appropriate to use the electronic map to display the points of interest that are provided for the user to conveniently search interesting digital contents.

A browsing page is exemplarily shown in the present example. The point of interest is marked on the electronic map according to the location where the digital content is produced. Some messages can be accompanied with the point of interest on the electronic map. The point of interest links to a location-based digital content that is based on coordinates where the digital content is produced. The digital content is stored in the database of the system according to its authoring user and coordinates. When the display area 303 covering a certain coordinate range on the graphical user interface 30 is selected, the digital contents in the display area 303 can be obtained by querying the database. The addresses of the digital contents linked to the database can be obtained. The representative image of every authoring user or the thumbnail of each of the digital contents is also obtained. The points of interest are formed and displayed on the display area 303 in a non-uniform arrangement. Each of the points of interest covers a certain visual range and is associated to one or more digital contents, but these digital contents do not necessarily associate to the same point of interest. The digital contents associated to the point of interest are formed based on the coordinates of the digital contents produced in the display area 303.

It is worth noting that, without affecting overall presentation, the links of a plurality of digital contents can be shown as different sizes of points of interest that are marked in the display area 303 according to the locations where the digital contents are produced. The number of linking icons such as the avatars or thumbnails of the digital contents used for representing the points of interest in the display area can have an upper limit, can be limited to a fixed number, or can be dynamically changed according to size of the display area. In particular, the system scores the points of interest in the display area 303 and calculates a ranking thereof according to a scoring criterion. A number of linking icons of points of interest are shown according to the ranking, and the linking icons are displayed in the display area according the locations (or coordinates) where the digital contents are produced. The rest of the points of interest in the display area may only have linking points (without the avatar or thumbnail) shown in the display area so as to prevent messy display content and can highlight the points of interest of a higher ranking.

Figure 4:
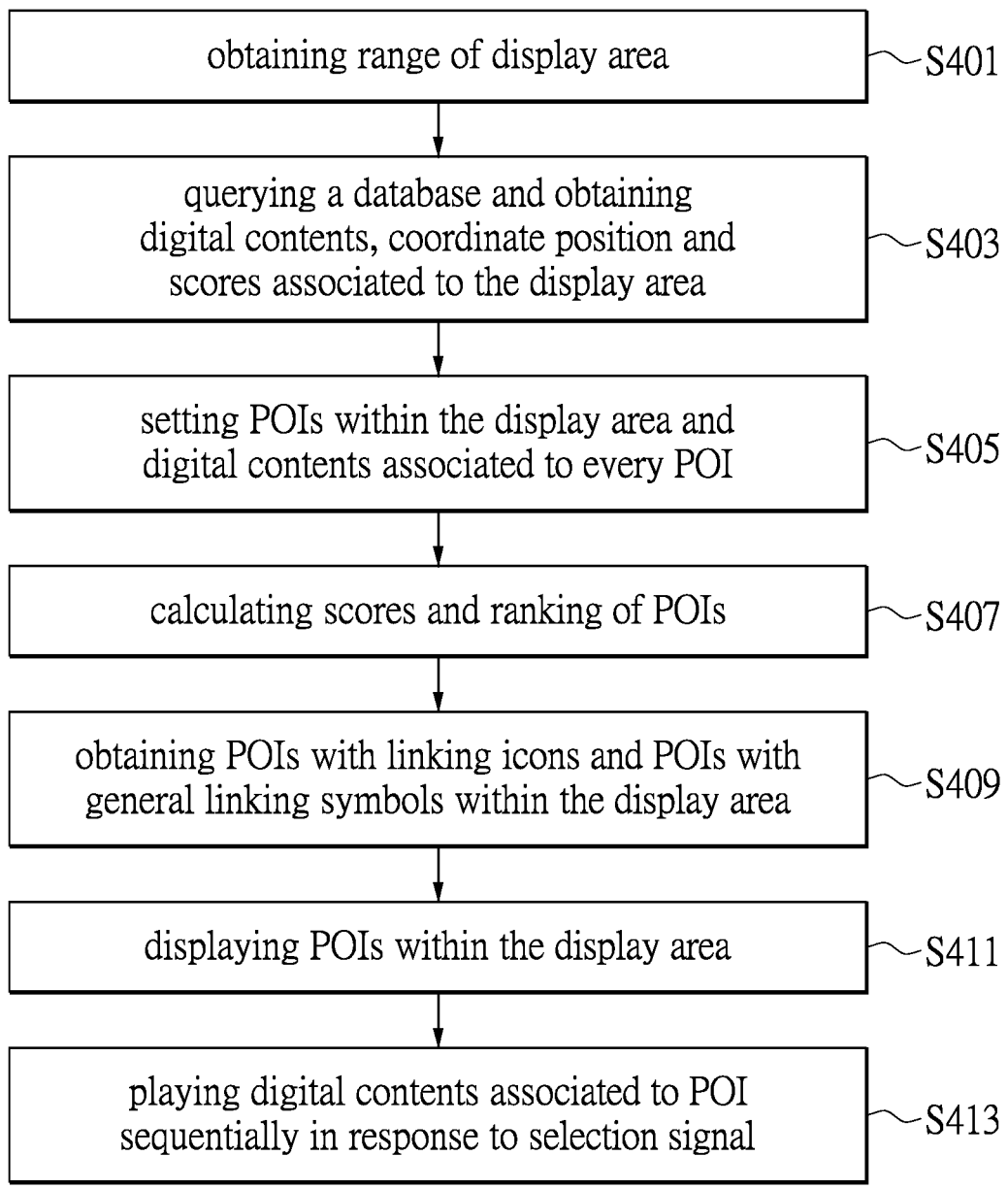
FIG. 4 shows a flow chart describing a method for dynamically displaying digital content according to one embodiment of the present disclosure.

Reference is made to FIG. 4, which shows a flow chart describing a method for dynamically displaying the digital content via the graphical user interface according to one embodiment of the disclosure.

The method is applied to a system that can be a serving system to provide the digital contents and a cloud system for executing a software program in the user device. According to the embodiment of the method, such as step S401, a display area is selected by a user who operates a graphical user interface. The coordinate range with respect to the display area can be determined according to a display resolution of the user device. The system then acquires the coordinate range of the display area of the user device.

Next, in the system, by querying a database disposed in the serving system or the database in a local system or the user device, such as in step S403, a plurality of digital contents associated to the display area, a linking address of each of the digital contents, coordinates linked to each of the digital contents associated to the display area, and a score with respect to every digital content can be obtained. It should be noted that a plurality of linking points of the digital contents formed in the display area are provided for the user to click for playing the selected digital content.

In the system, such as in step S405, a plurality of points of interest shown in the display area and the digital contents associated to each of the points of interest are setup by the system and the program executed in the user device. When the digital contents within the coordinate range are obtained from the database, the program executed in the user device sets up the plurality of points of interest based on the coordinate range of the display area, the coordinates of each of the digital contents in the display area, and criterion for each of the plurality of points of interest in the display area. Each of the points of interest has coordinates to be displayed in the display area, a number of the display contents and the coordinate range.

In step S407, the software program executed in the user device calculates a score of each point of interest and a ranking of the points of interest according to the scores of the digital contents. The score of the point of interest refers to a sum of scores or a specific statistical value of all digital contents associated to the point of interest. The scores of the digital contents associated to the point of interest are used to obtain the ranking of the plurality of points of interest in the display area. The ranking may affect the linking icons shown in the display area. The linking icon of the point of interest can be one of the thumbnails or representative images of the authoring users of the digital contents associated to the point of interest.

In step S409, according to the ranking, the linking icons and the ordinary linking symbols of the points of interest can be obtained. The linking icons or the ordinary linking symbols are mapped to the corresponding locations in the display area according to the coordinates of the points of interest. In step S411, in the user device, a browsing page is first shown, and the plurality of points of interest are also shown in the display area. In step S413, the software program executed in the user device determines a display range when the user operates the touch screen of the user device. When a touch event is sensed by the user device, one of the points of interest is selected according to a selection signal, and then the digital contents associated to the selected point of interest are played sequentially.

For example, the range of the display area is based on a coordinate range of an electronic map selected by the user. When the user operates the user device to select the coordinate range via a touch screen with gestures by his finger or any stylus, a series of touch signals are generated and received by an operating system and a software procedure executed in the user device. The software procedure is performed to determine the range of the display area according to the above information, and also derives the coordinate range on the electronic map. The coordinates associated to the digital content is generally the geographic location where the digital content is produced.

Figure 5:
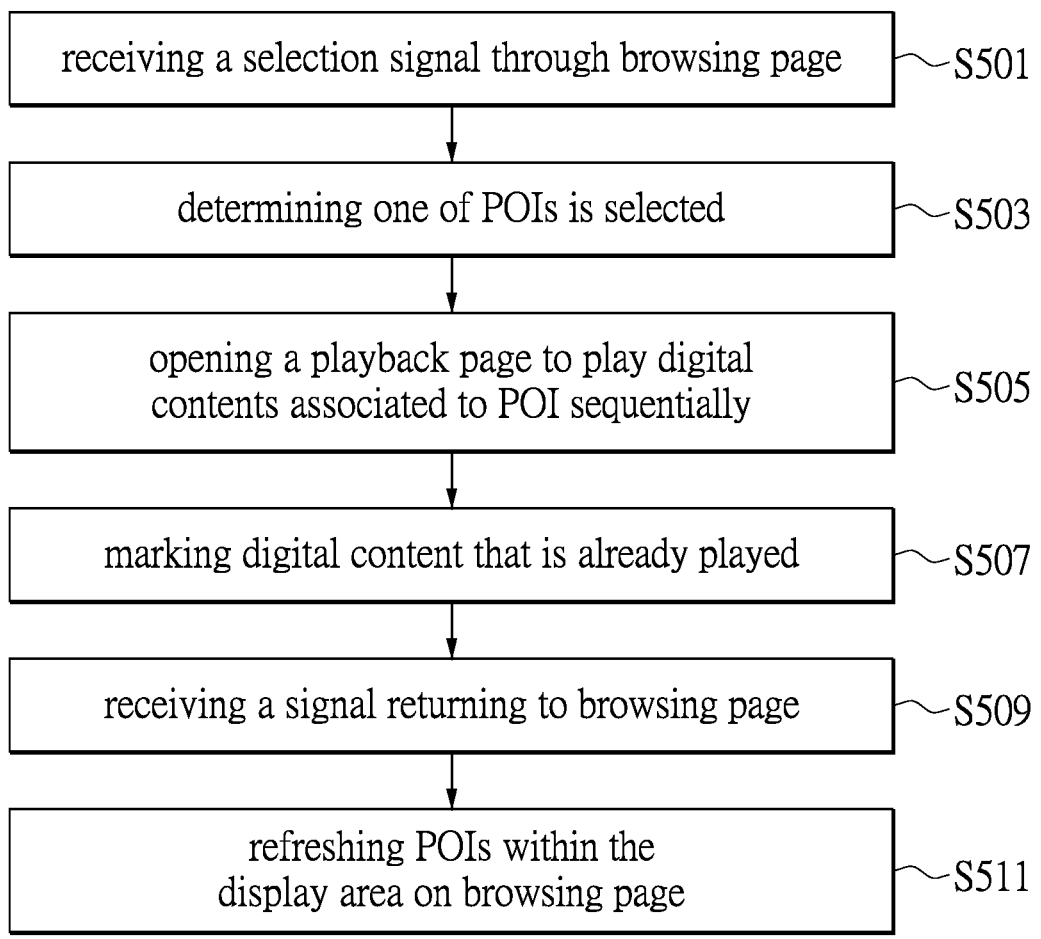
FIG. 5 shows a flow chart describing a process for refreshing the content that is displayed by the method for dynamically displaying digital content in one embodiment of the present disclosure.

In one embodiment of the disclosure, when setting up the points of interest in the display area, each of the points of interest is such as a tag recorded in a memory of the user device. The tag records a linking address of the one or more digital contents associated to the point of interest according to the ranking. The point of interest and the method for playing and refreshing the digital contents can be referred to in the flow chart shown in FIG. 5.

In step S501, firstly, a browsing page is initiated in a graphical user interface. The points of interest shown in the browsing page are based on a selection signal that is generated when a user operates the graphical user interface. A ranking among the points of interest displayed is calculated according to the scores of the digital contents associated to the points of interest. Multiple linking icons are used to represent a number of points of interest with highest rankings. For example, top five points of interest are shown in the display area on the browsing page. The rest of the points of interest (e.g., the points of interest other than the top five POIs) can be represented by ordinary linking symbols shown in the display area.

In step S503, the software program executed in the user device determines the point of interest to be selected according to the gesture of the user. The point of interest as shown in the display area associates with one or more digital contents via one or more linking addresses. Thus, such as in step S505, the software program executed in the user device initiates a playback page for sequentially playing the digital contents associated to the point of interest. Further, the digital contents associated to the same point of interest can be sequentially played according to a ranking of these contents. However, it is not necessary for playing the digital contents based on the ranking, and therefore the contents can be played randomly or according to one or more conditions based on some scoring criterion.

When the software program sequentially plays the digital contents associated to one of the points of interest according to a selection signal through the user device, the digital contents that have been played are labeled and the points of interest being displayed in the display area are refreshed according to information of the labeled digital contents. For example, such as in step S507, the software program operated in the user device marks the digital contents that are regarded as already played since the digital contents meet the criterion that regulates the digital contents that are played. The digital contents associated to the selected point of interest can be played sequentially. For example, the software program switches to playing a next digital content when one of the digital contents is played for a certain number of seconds, which is set as a timing criterion to regulate the digital contents to be regarded as played.

Next, in step S509, when one of the digital contents meets the above criteria, the user can close the playback page and the software program receives a signal to return to the browsing page. In step S511, the software program refreshes the points of interest displayed in the display area on the browsing page. Specifically, when the digital contents associated to the point of interest are played, the software program can receive the status that the digital contents are played and will not use the thumbnails of the digital contents that are played as the representative image of the point of interest. When returning to the browsing page, the points of interest displayed in the display area are refreshed, and the thumbnails of the digital contents that are not played can be used as the representative icons of the points of interest.

Further, the criteria that are referred to so as to refresh the points of interest displayed in the display area include, when the user uses the user device to adjust coordinate range of the display area or resize the display area such that the display area is changed, the system performs the steps in the method for dynamically displaying the digital content again. According to the flow charts shown in FIG. 4 and FIG. 5, the points of interest displayed in the display area are refreshed when re-querying the digital contents displayed in the display area, scoring each of the points of interest, or re-marking the points of interest.

Figure 6A:
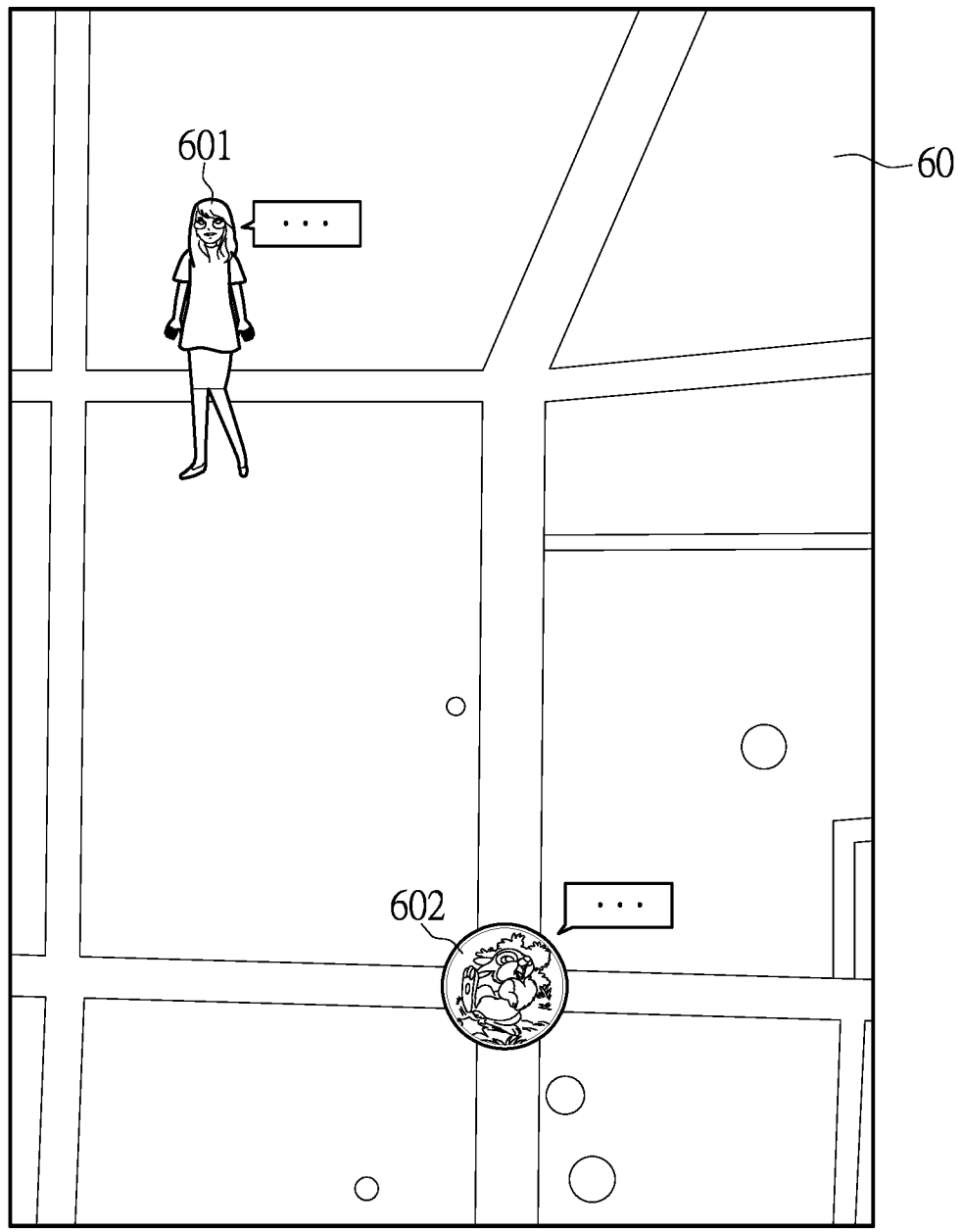
FIG. 6A and FIG. 6B are schematic views depicting the content that is refreshed in the method for dynamically displaying digital content in one further embodiment of the present disclosure.
Figure 6B:
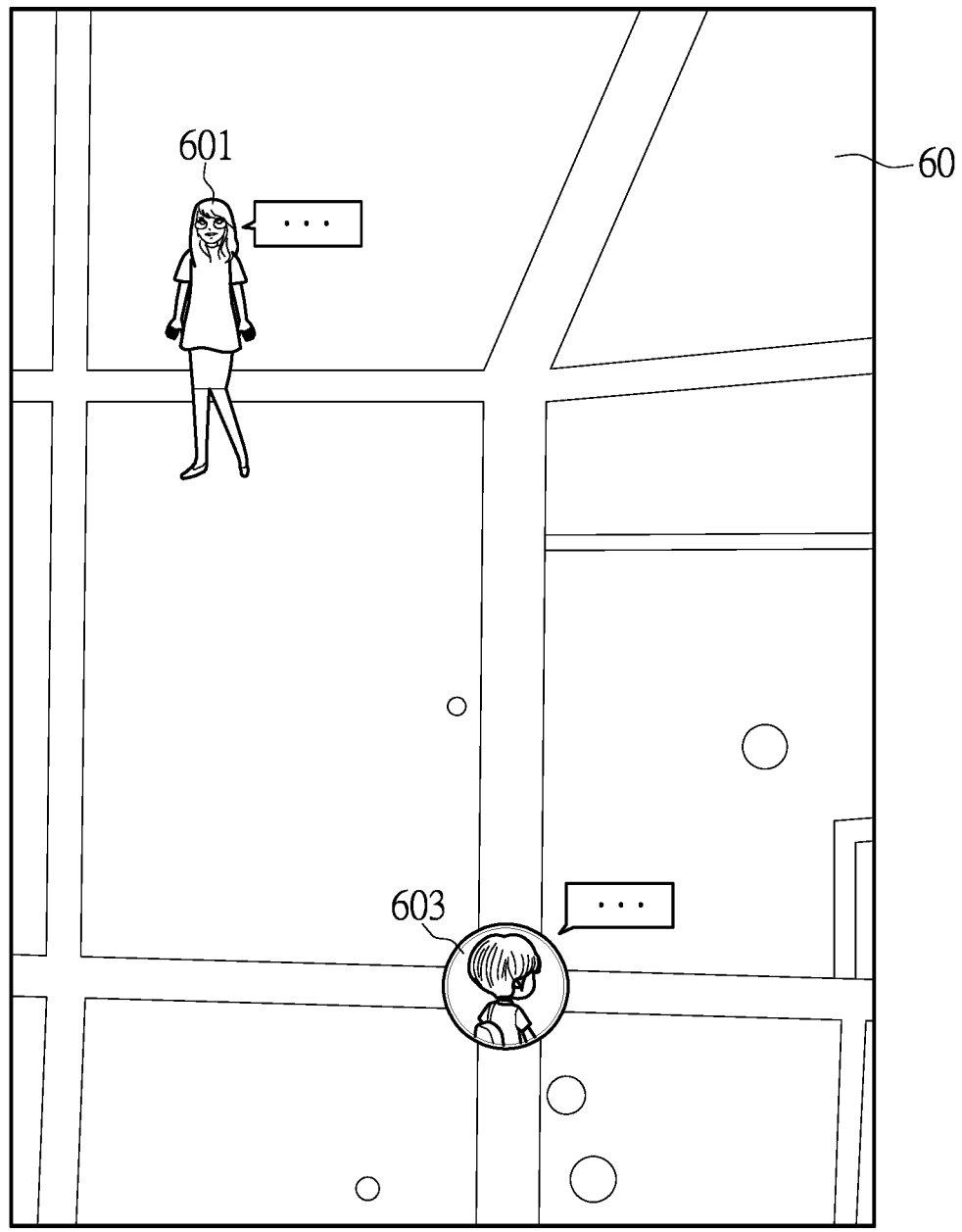

In the method for dynamically displaying the digital content, the content displayed in the display area can be refreshed regularly as can be referred to in the schematic diagrams of FIG. 6A and FIG. 6B. FIG. 6A shows partial contents in a display area 60. In an exemplary example, a first point of interest 601 and a second point of interest 602 are shown. When the digital contents associated to the second point of interest 602 are played, the linking icons of the related digital contents are labeled as played, and the software program returns to the browsing page from the playback page. The points of interest displayed in the display area of the browsing page are refreshed. Accordingly, the linking icons of the points of interest are replaced by the thumbnails of the digital contents that are not played yet. FIG. 6B exemplarily shows a schematic diagram showing a refreshed page that already excludes the labeled digital contents, in which the linking icon of the original second point of interest 602 is replaced by the linking icon of a third point of interest 603.

It is worth noting that the digital content associated to any point of interest may be related to a range of the display area occupied by the linking icons of the points of interest. With an electronic map as an example, the range occupied by the linking icon of the point of interest includes one or more digital contents that may form a media group. If the ranges (that change with the size of the display area) occupied by the linking icons of the adjacent points of interest are overlapped or too close with each other, the related linking icons can be grouped for the convenience of browsing. Therefore, according to one embodiment of the disclosure, the above-mentioned criteria that are referred to for displaying the points of interest in the display area include: sizes of the linking icons or ordinary linking symbols determined by number and scores of the digital contents associated to the points of interest, an upper limit of number of digital contents associated to every point of interest, spacing among the points of interest, and a number of points of interest that are represented by every linking icon.

Figure 7:
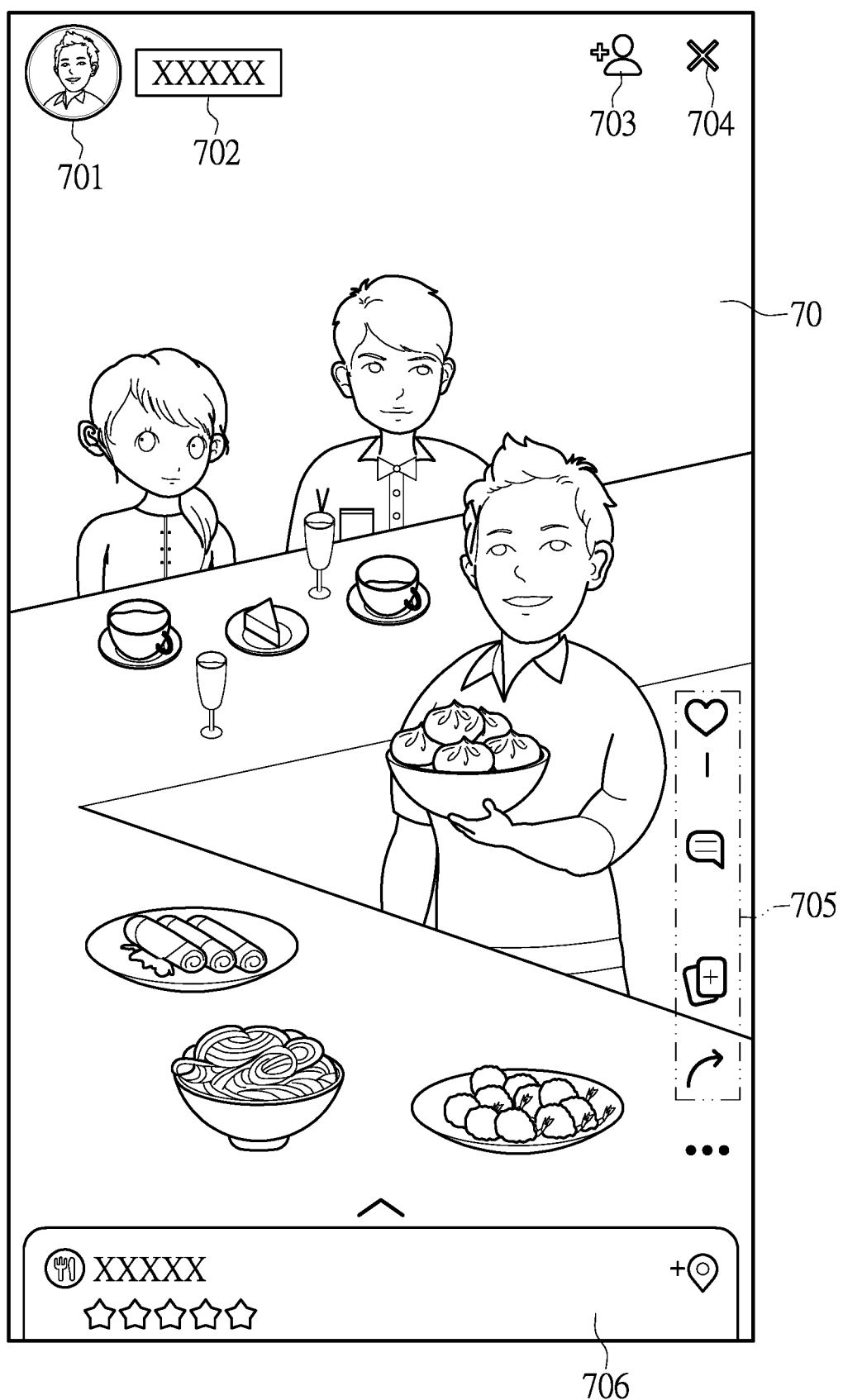
FIG. 7 is a schematic view depicting a page whereon the digital content is played in one embodiment of the disclosure.

FIG. 7 is a schematic diagram depicting the playback page in a graphical user interface according to one embodiment of the disclosure. Same as the abovementioned browsing page, the playback page is also a computer-implemented graphical user interface, preferably displayed on a touch screen of the user device. On a playback page 70, the digital contents associated to the selected point of interest can be played continuously. The digital contents can be played on the playback page 70 according to a sequence based on the scores of these digital contents. Alternatively, the playback page 70 allows a user to decide to play a previous digital content (e.g., swiping toward a right side of the screen) or a next digital content (e.g., swiping toward a left side of the screen).

Further, the playback page 70 may include other usable functional icons, such as a representative image 701 and a name 702 of an authoring user positioned at the upper left corner of the screen and a function button 703 at the upper right corner of the screen that allows the browsing user to add the authoring user as a friend of the browsing user. Further, a button 704 to close this playback page 70 and return back to the browsing page is also provided. The graphical user interface can also provide several buttons with interactive function 705. The playback page 70 provides information of production location 706 of the present digital content.

Figure 8:
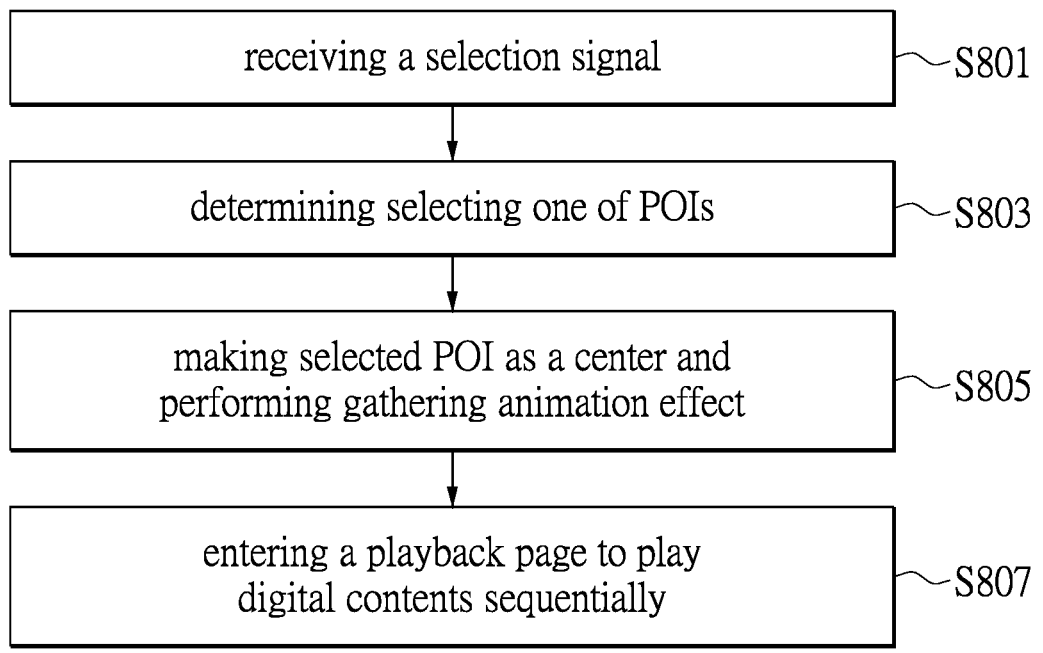
FIG. 8 shows a flow chart describing a process of showing an animation effect when playing the digital content in the method for dynamically displaying digital content according to one embodiment of the disclosure.
Figure 9:
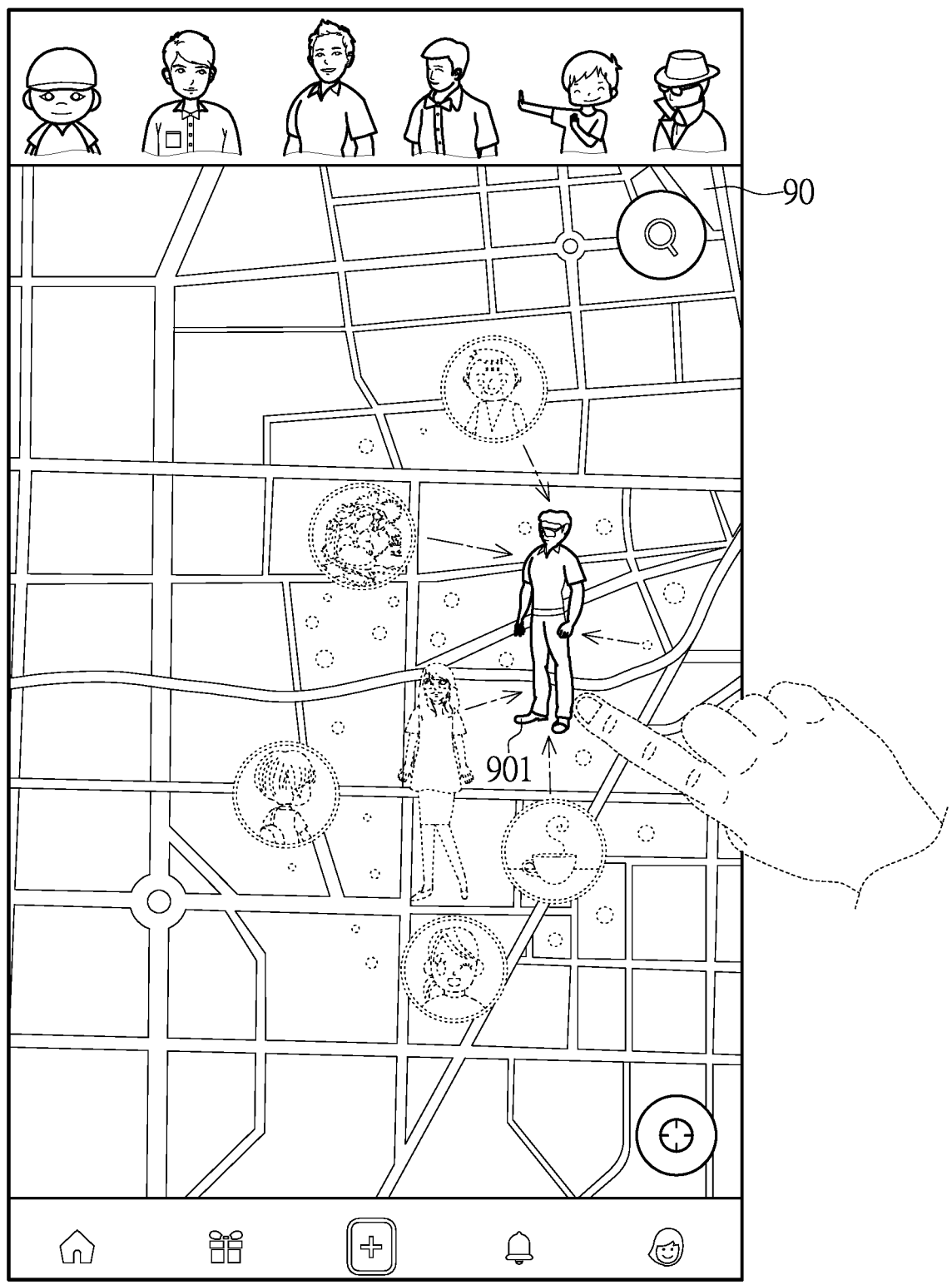
FIG. 9 is a schematic view depicting a converging animation effect in an exemplary example of the disclosure.

Further, in the method for dynamically displaying the digital content, according to one embodiment of the disclosure, when the user device receives the selection signal relating to the selected point of interest, the software procedure operated in the user device determines the selected point of interest and performs a converging animation effect that is exemplarily shown in FIG. 8 and FIG. 9.

FIG. 8 shows a flow chart that describes a process of generating animation effect when the digital content is played in the method.

In step S801, the software procedure operated in the user device receives a selection signal. In step S803, one of the points of interest displayed in the display area can be determined according to the selection signal as the user makes a selection. In step S805, the software procedure executes the converging animation effect.

According to one of the embodiments of the disclosure, the point of interest selected by the user is regarded as a center, and the linking icons and the ordinary linking symbols of the points of interest around the central point of interest form moving images that move toward the center, i.e., the selected point of interest. In detail, multiple moving paths are created according to the directions and distances between the rest of the points of interest and the selected point of interest. For each of the other points of interest, multiple images are continuously shown along the moving path for a period of time so as to present a converging animation effect. In other words, the multiple images become continuously-changed images that are simulated to move toward the central point of interest, thereby achieving the converging animation effect.

The moving points can be accelerated to move to a specific point so as to show the converging animation effect. All the linking icons or the ordinary linking symbols have original sizes. The sizes of the linking icons or the ordinary linking symbols gradually change during the converging process. For example, the sizes of the icons become smaller when they are closer to the selected point of interest. Finally, such as in step S807, the digital contents are played sequentially when entering the playback page.

FIG. 9 is a schematic diagram depicting the converging animation effect performed in the method for dynamically displaying digital content in one embodiment of the disclosure. The browsing page shown in the diagram includes a display area 90 that includes a user linking area at the top of the screen and a functional area at the bottom of the screen. When a user touches the point of interest 901 with his finger, the points of interest around the point of interest 901 are gathered together to the point of interest 901, showing the abovementioned converging animation effect.

In summation, according to the above embodiments of the method for dynamically displaying digital content, the graphical user interface and the system thereof, the method provides a visualized effect that displays the points of interest on the graphical user interface in a non-uniform arrangement, and provides the visualized effects of refreshing the contents and converging animation effect. The user can therefore experience the visualized operation on the graphical user interface. The visualized effect is suitable to be operated in the social media that mainly provides for sharing of the digital contents.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for dynamically displaying a digital content, comprising: obtaining a coordinate range of a display area of a user device; querying a database so as to obtain a plurality of digital contents associated to the display area, a linking address of each of the digital contents, coordinates linked to each of the digital contents associated to the display area, and a score with respect to each of the digital contents; setting up a plurality of points of interest in the display area according to coordinates of the plurality of digital contents and the coordinate range of the display area, wherein each of the points of interest associates to one of the coordinates displayed within the display area and one or more digital contents within the display area; calculating a ranking of the plurality of points of interest in the display area according to scores of the digital contents associated to the points of interest; and according to the ranking, using multiple linking icons to indicate a certain number of highest ranking of points of interest to be shown within the display area, and using ordinary linking symbols specified to the rest of the points of interest within the display area; wherein each of the points of interest in the display area associates to one or more digital contents with one or more linking addresses, and the one or more digital contents are played sequentially when the point of interest is clicked on, wherein the plurality of points of interest in the display area are setup based on criteria for displaying the points of interest in the display area, and the criteria include a size of every linking icon or every ordinary linking symbol determined by number and scores of the digital contents, an upper limit of the number of the digital contents associated to each of the points of interest, a distance between each two adjacent ones of the points of interest, and a number of the points of interest that are shown as the linking icons.

2. The method according to claim 1, wherein, when the display area changes, the plurality of points of interest displayed in the display area are refreshed for excluding the point of interest that links to the digital content that is already played.

3. The method according to claim 1, wherein the display area is displayed according to a coordinate range selected by a user that operates the user device, and coordinates of the digital content associated to the display area is a geographic location where the digital content is produced; and wherein when setting up the plurality of points of interest within the display area, each of the points of interest is a tag recorded in a memory of the user device, and the tag associates to linking addresses of the digital contents that are sorted according to scores of the digital contents linked with the points of interest.

4. The method according to claim 3, wherein the digital content is scored by a serving system based on a number of creations of an authoring user of the digital content, a number of followers of the digital content, a number of times the digital content is played, a rating, a time that the digital content is created, or a personal interest of the user viewing the digital content, or any combination thereof.

5. The method according to claim 1, wherein, when the user device receives a selection signal, the point of interest is determined to be selected according to the selection signal, and the user device performs a converging animation effect comprising:

setting up the point of interest as a central point of interest, and linking icons and ordinary linking symbols of the other points of interest to form multiple moving images;

establishing a moving path for the linking icons and ordinary linking symbols of each of the other points of interest according to a direction and a distance toward the central point of interest;

producing multiple images configured to move along the moving path for each of the moving images; and for each of the other points of interest, continuously showing the multiple images along each of the moving paths for a period of time so as to present a converging animation effect in which the multiple images become continuously-changing images simulating a moving image moving toward the central point of interest.

6. The method according to claim 1, wherein, when the user uses the user device to adjust the coordinate range of the display area or resize the display area, the display area is changed, and the system performs the method for dynamically displaying the digital content in order to refresh the points of interest displayed in the display area.

7. The method according to claim 1, wherein the digital contents associated to one of the points of interest are played sequentially according to a selection signal, and the digital contents that have been played are labeled via the user device and the points of interest displayed in the display area are refreshed according to information of the labeled digital contents.

8. A computer-implemented graphical user interface that is displayed on a touch screen of a user device and includes a visualized display area, wherein a method for dynamically displaying a digital content is performed through the graphical user interface, the method including:

querying a database to obtain a plurality of digital contents associated to the display area, a linking address of each of the digital contents, coordinates linked to each of the digital contents associated to the display area, and a score with respect to every digital content according to the display area with a coordinate range formed by a user operating the touch screen;

setting up a plurality of points of interest in the display area according to the coordinate range of the display area and coordinates of the plurality of digital contents associated to the display area, wherein each of the points of interest has the coordinate displayed in the display area and the digital contents associate to the coordinate range and numbers;

calculating a ranking of the plurality of points of interest in the display area according to scores of the digital contents associated to the points of interest; and according to the ranking, using multiple linking icons to indicate a certain number of highest ranking of points of interest to be shown within the display area, and using ordinary linking symbols to indicate the rest of the points of interest within the display area; wherein every point of interest in the display area associates to one or more linking addresses of the digital contents, and the one or more digital contents are played sequentially when the point of interest is clicked, wherein the plurality of points of interest in the display area are setup based on criteria for displaying the points of interest in the display area, and the criteria include a size of every linking icon or every ordinary linking symbol determined by number and scores of the digital contents, an upper limit of the number of the digital contents associated to each of the points of interest, a distance between each two adjacent ones of the points of interest, and a number of the points of interest that are shown as the linking icons.

9. The graphical user interface according to claim 8, wherein the display area shows an electronic map and covers a geographic coordinate range selected by the user operating the display area; the coordinates of the display area linked to every digital content is a geographic location where the digital content is produced; when setting up the points of interest in the display area, criteria to be referred to for displaying the points of interest in the display area include: sizes of the linking icons or ordinary linking symbols of the digital contents determined by number and scores of the digital contents associated to the points of interest, an upper limit of a number of the digital contents associated to every point of interest, spacing among the points of interest, and a number of points of interest that are represented by every linking icon.

10. The graphical user interface according to claim 8, wherein, when the user device receives a selection signal via the touch screen, the point of interest to be selected is determined according to the selection signal, and steps for performing a converging animation effect on the graphical user interface including:

setting up the point of interest as a central point of interest, and linking icons and ordinary linking symbols of the other points of interest form multiple moving images;

establishing a moving path for each of the other points of interest according to a direction and a distance toward the central point of interest;

producing multiple images configured to move along the moving path for each of the moving images; and for each of the other points of interest, continuously showing the multiple images along the moving path for a period of time so as to present a converging animation effect in which the multiple images become continuously-changing images simulating the moving image moving toward the central point of interest.

11. The graphical user interface according to claim 8, wherein, when the user uses the user device to adjust the coordinate range of the display area or resize the display area, the display area is changed, and the system performs the method for dynamically displaying digital content in order to refresh the points of interest displayed in the display area.

12. The graphical user interface according to claim 8, wherein the digital contents associated to one of the points of interest are played sequentially according to a selection signal, the digital contents that have been played are labeled and the points of interest being displayed in the display area are refreshed according to information of the labeled digital contents.

13. The graphical user interface according to claim 12, wherein, when one or more digital contents associated to the point of interest that is presented by the linking icon is labeled as played, the linking icon of the point of interest is replaced by a thumbnail of one of the digital contents that are not played when the points of interest displayed in the display area are refreshed.

14. A system comprising a serving system for serving digital contents and a software program executed in a user device, and the method for dynamically displaying digital content performed through the graphical user interface in the system includes: a processor;

receiving a coordinate range of a display area of the user device;

querying a database of the serving system to obtain a plurality of digital contents associated to the display area, a linking address of each of the digital contents, coordinates of the display area associated to the digital contents, and score of each of the digital contents;

setting up a plurality of points of interest in the display area according to the coordinate range of the display area and coordinates of the plurality of digital contents associated to the display area, wherein each of the points of interest associates to one of the coordinates and a number of digital contents within the display area;

calculating a ranking of the plurality of points of interest in the display area according to scores of the digital contents associated to the points of interest; and according to the ranking, using multiple linking icons to indicate a certain number of highest ranking of points of interest to be shown within the display area, and using ordinary linking symbols to indicate the rest of the points of interest within the display area; wherein every point of interest in the display area associates to one or more digital contents with one or more linking addresses, and the one or more digital contents are played sequentially when the point of interest is clicked, wherein the plurality of points of interest in the display area are setup based on criteria for displaying the points of interest in the display area, and the criteria include a size of every linking icon or every ordinary linking symbol determined by number and scores of the digital contents, an upper limit of the number of the digital contents associated to each of the points of interest, a distance between each two adjacent ones of the points of interest, and a number of the points of interest that are shown as the linking icons.

15. The system according to claim 14, wherein, when setting up the plurality of points of interest within the display area, each of the points of interest is a tag recorded in a memory of the user device and the tag associates to linking addresses of the digital contents that are sorted according to scores of the digital contents linked with the points of interest.

16. The system according to claim 15, wherein the digital content is scored by the serving system based on a number of creations of an authoring user of the digital content, a number of followers of the digital content, a number of times the digital content is played, a rating, a time that the digital content is created, or a personal interest of the user viewing the digital content, or any combination thereof.

17. The system according to claim 14, wherein, when the user device receives a selection signal, the point of interest is determined to be selected according to the selection signal, and the user device performs steps for performing a converging animation effect including:
    setting up the point of interest as a central point of interest, and linking icons and ordinary linking symbols of the other points of interest form multiple moving images;
    establishing a moving path for each of the other points of interest according to a direction and a distance toward the central point of interest;
    producing multiple images configured to move along the moving path for each of the moving images; and
    for each of the other points of interest, continuously showing the multiple images along the moving path for a period of time so as to present a converging animation effect in which the multiple images become continuously-changing images simulating the moving image moving toward the central point of interest.

18. The system according to claim 14, wherein the digital contents associated to one of the points of interest are played sequentially according to a selection signal and the points of interest displayed in the display area are refreshed according to information of the labeled digital contents.

* * * * *